United States Patent [19]

Toda et al.

[11] Patent Number: 4,665,318
[45] Date of Patent: May 12, 1987

[54] RECORDING MEDIUM MARK DETECTOR

[75] Inventors: Takao Toda, Tokyo; Toshiaki Mizushima, Kawasaki; Kazuo Kashiwagi, Tokyo, all of Japan

[73] Assignee: Canon Kabushiki Kaisha, Tokyo, Japan

[21] Appl. No.: 777,600

[22] Filed: Sep. 19, 1985

[30] Foreign Application Priority Data

Oct. 11, 1984 [JP] Japan ................................. 59-212928
Oct. 11, 1984 [JP] Japan ................................. 59-212929
Oct. 11, 1984 [JP] Japan ................................. 59-212930
Oct. 11, 1984 [JP] Japan ................................. 59-212931
Aug. 30, 1985 [JP] Japan ................................. 60-191421

[51] Int. Cl.⁴ ........................................... G06K 7/10
[52] U.S. Cl. .................... 250/570; 353/26 A
[58] Field of Search ............... 250/200, 201, 548, 206, 250/557, 559, 561–562, 208–209, 216, 570–572, 221, 222.1, 223 R, 224, 227, 578, 234; 353/25, 26 R, 26 A

[56] References Cited

U.S. PATENT DOCUMENTS 3,885,866  5/1975  Stearns ................................. 250/570
3,999,846 12/1976  Sone et al. ......................... 250/570
4,436,391  3/1984  Kashiwagi ......................... 353/26 R
4,514,641  4/1985  Tanaka et al. .................... 353/26 A Primary Examiner—Eugene R. Laroche
Assistant Examiner—David Mis
Attorney, Agent, or Firm—Fitzpatrick, Cella, Harper & Scinto

[57] ABSTRACT

A mark detecting apparatus for detecting marks provided on a recording medium has a photoelectric converting device for receiving a light from the base and marks on the recording medium, a first setting device for setting a first predetermined reference value, a second setting device for setting a second reference value corresponding to the output of the photoelectric converting device, and a detecting device for selecting one of the first reference value and the second reference value and comparing the selected reference value with the output of the photoelectric converting device to thereby detect the presence or absence of the marks.

22 Claims, 11 Drawing Figures

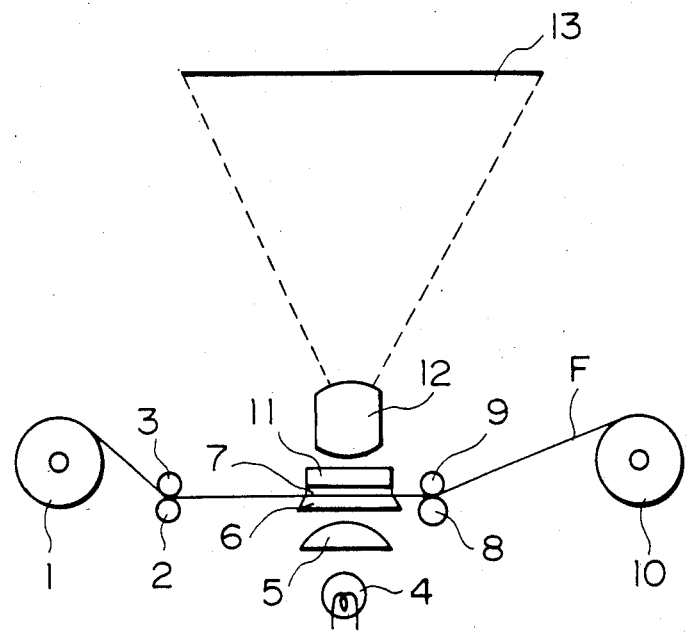
F I G. 1
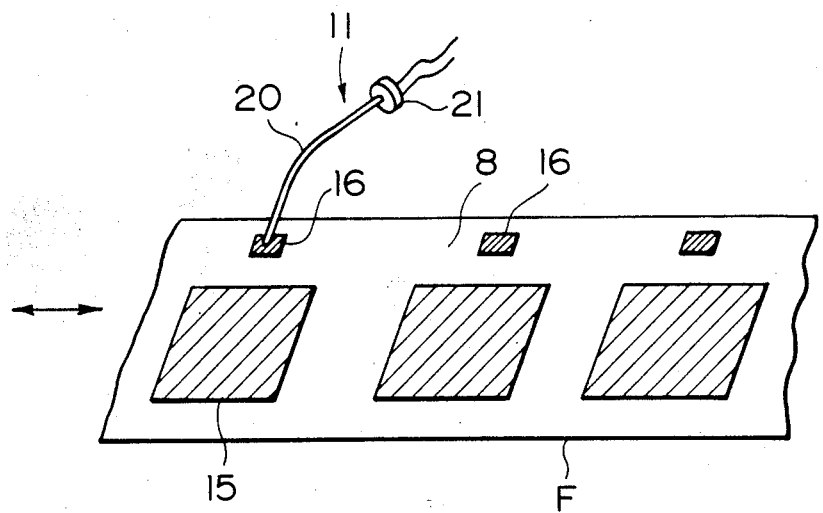
F I G. 2

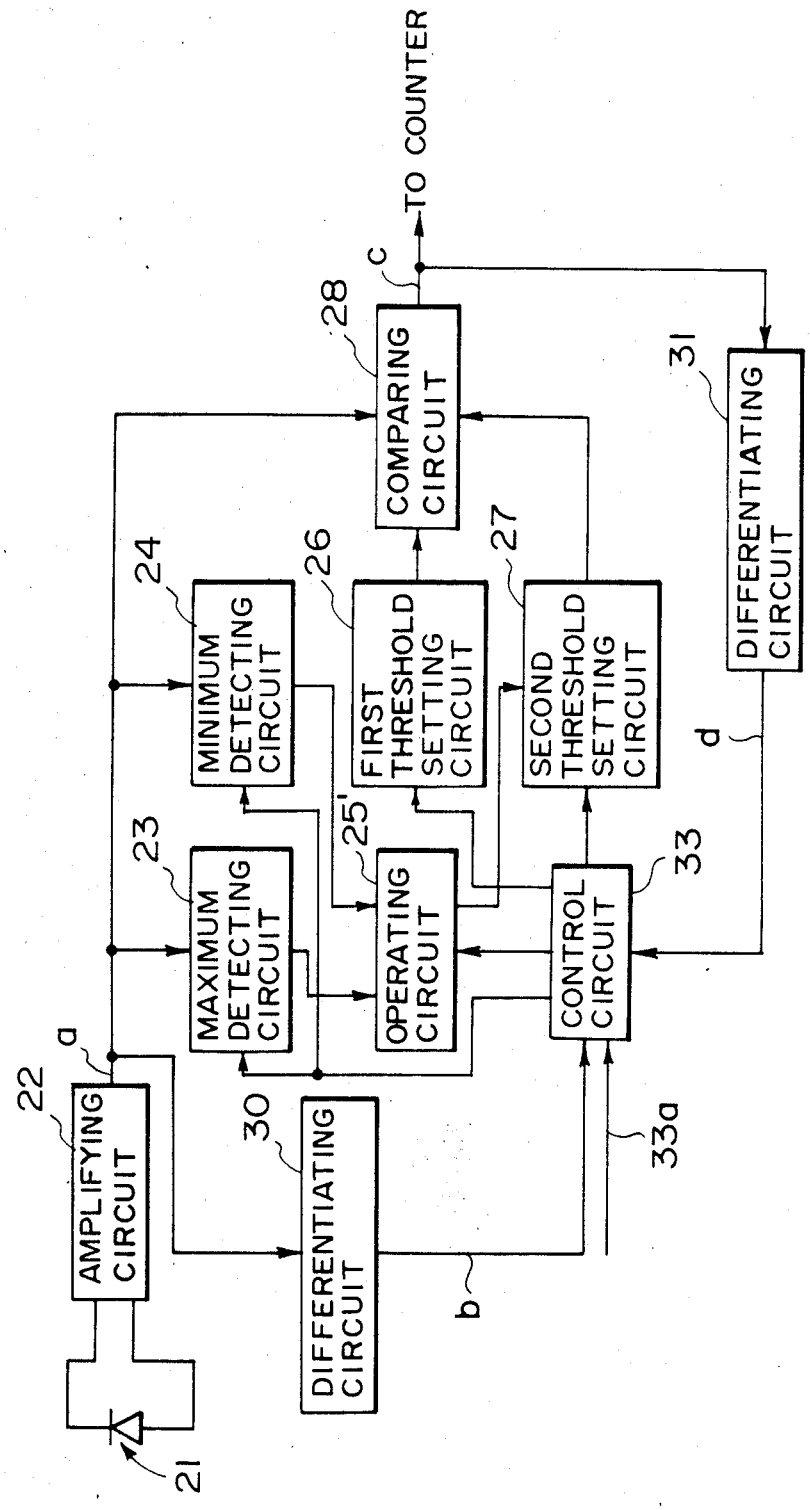
F I G. 7

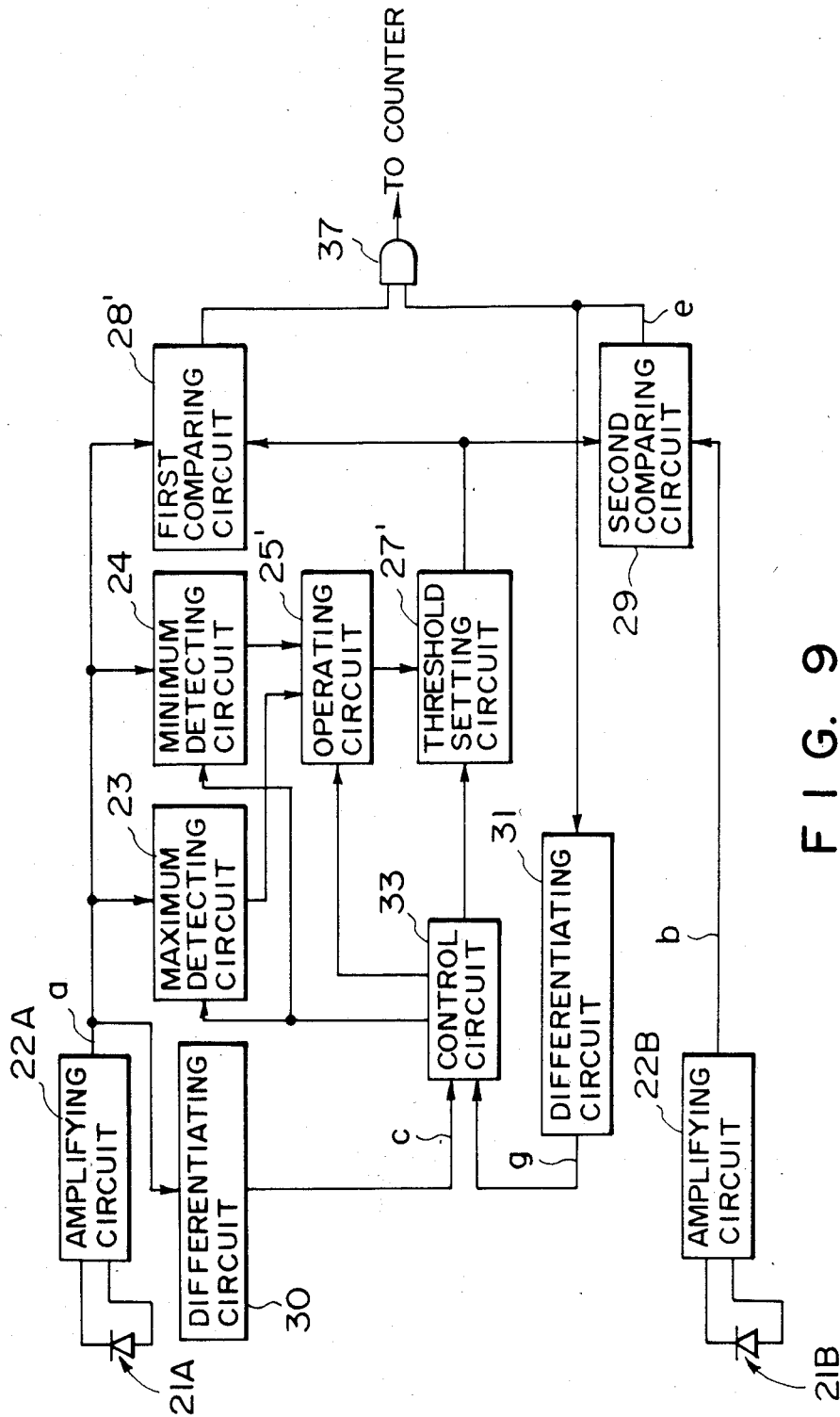
F I G. 9

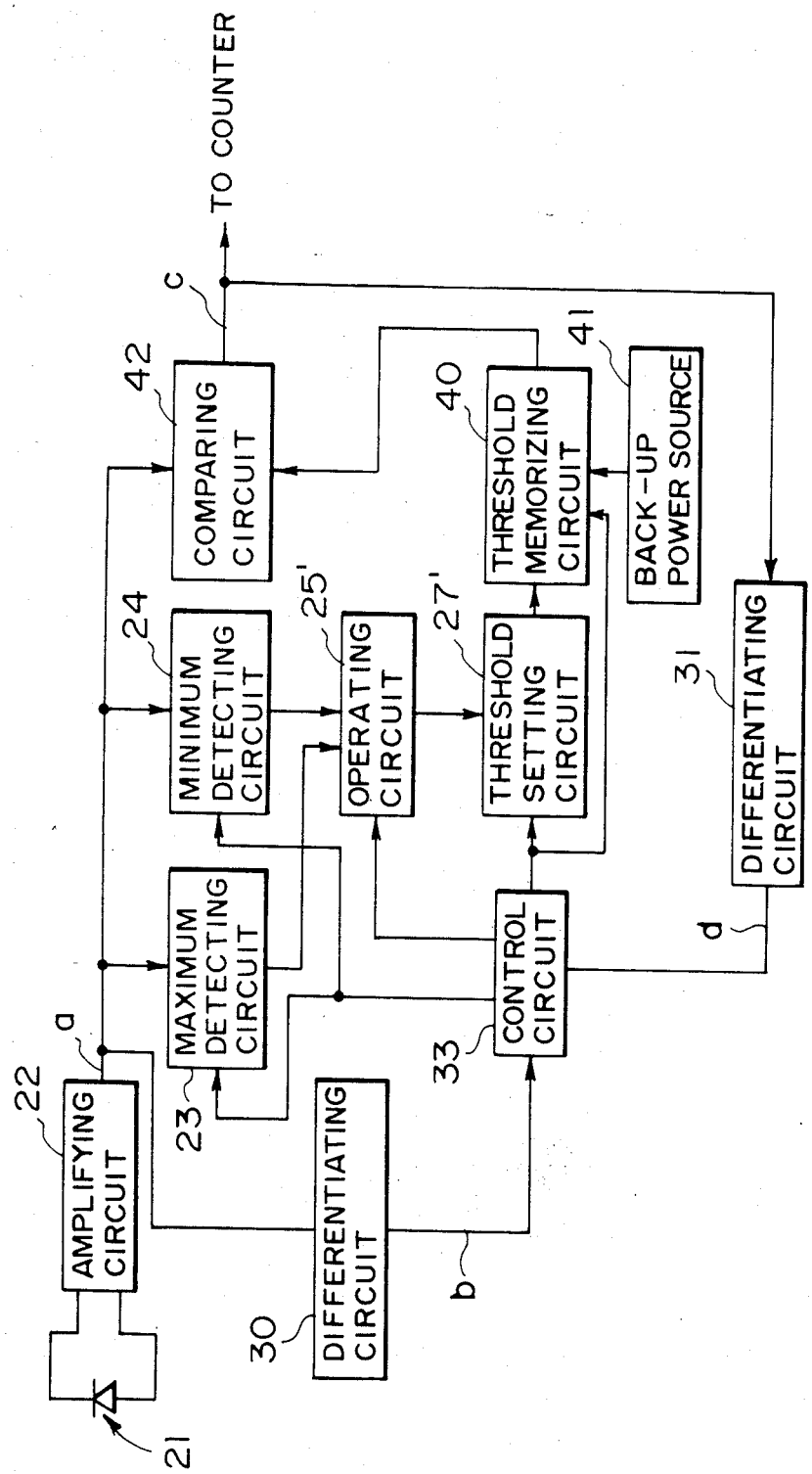
F I G. 11

RECORDING MEDIUM MARK DETECTOR

BACKGROUND OF THE INVENTION

1. Field of the Invention

This invention relates to a mark-detecting apparatus for detecting marks provided on a recording medium such as a film or a tape.

2. Description of the Prior Art

Heretofore, in an information searching apparatus incorporated in a film reader or the like, use has been made of a film having marks provided at a side edge of the frames of the film and these marks have been optically detected and counted, whereby a desired frame in the film has been automatically searched.

The above-described searching apparatus is designed such that the marks on the film are illuminated by a lamp and the variation in light intercepted by the marks when the film is transported is detected by a mark detector and the output signal of this mark detector is counted by a counter and the count content of this counter is compared with the circuit to a drive control circuit to thereby stop a driving system for transporting the film and bring the desired frame to a standstill at a predetermined position whereat it is projected onto a screen.

However, in the thus constructed searching apparatus, the marks on the film are optically detected by the photoelectric conversion element of the mark detector and therefore, when the quantity of light of the lamp greatly varies (for example, when the lamp has broken and been replaced with a new lamp, or when the lamp has deteriorated, or when the power source voltage has greatly fluctuated), the degree of allowance for the variation in quantity of light for the mark detection is varied and in some cases, the marks cannot be properly detected, and this has given rise to the problem that the wrong frame is searched.

Also, if the concentrations of the base and marks of the film differ variously depending on the kind of the film and the treatment conditions of the film, the marks sometimes cannot be detected properly and, as previously mentioned, this has led to the problem that the wrong frame is searched.

SUMMARY OF THE INVENTION

It is an object of the present invention to provide a mark detecting apparatus which can properly detect marks irrespective of the fluctuation of the intensity of illumination of a light source and the fluctuation of the concentration of a recording medium.

It is another object of the present invention to enable a mark which is to be first detected at the start of searching to be properly detected.

It is still another object of the present invention to provide a mark detecting apparatus which can reliably detect marks even if the intensity of illumination of a light source fluctuates during the conveyance of a recording medium or there are in the recording medium portions in which the concentration varies.

BRIEF DESCRIPTION OF THE DRAWINGS

FIG. 1 shows the construction of the essential portions of a film reader to which the present invention is applied.

FIG. 2 is a perspective view of a mark detector

FIG. 7 is a block diagram of another embodiment of the mark detecting circuit.

FIG. 9 is a block diagram of still another embodiment of the mark detecting circuit.

FIG. 11 is a block diagram of yet still another embodiment of the mark detecting circuit.

DESCRIPTION OF THE PREFERRED EMBODIMENTS

Figure 3:
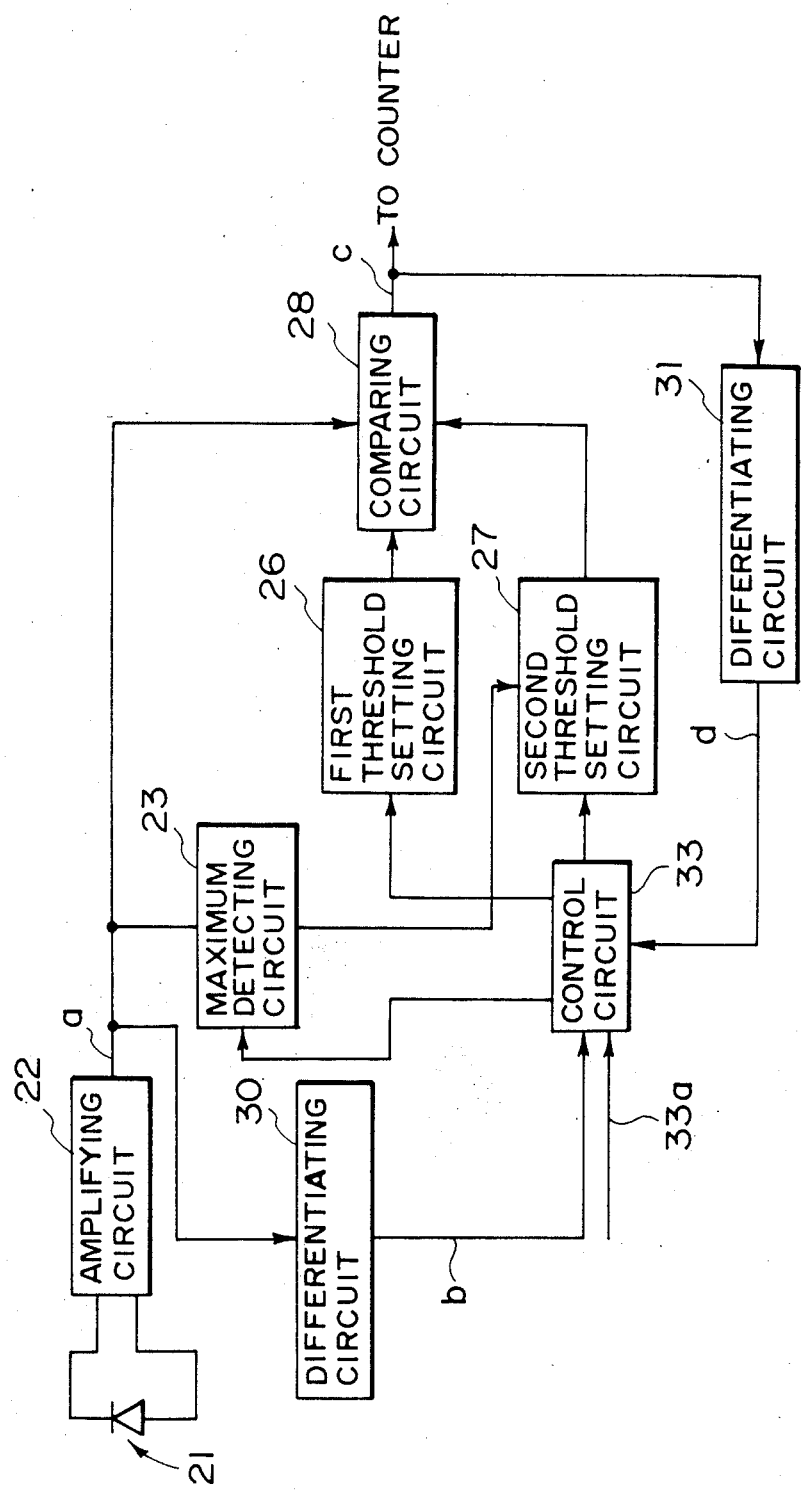
FIG. 3 is a block diagram of a mark detecting circuit.

The details of the present invention will hereinafter be described with reference to the drawings.

FIG. 1 shows a microfilm reader provided with an information searching apparatus to which the present invention is applied. In FIG. 1, reference numeral 1 designates a supply reel, reference numerals 2 and 3 denote guide rollers, reference numeral 4 designates a lamp for illuminating a microfilm, reference numeral 5 denotes a condensing lens, reference numerals 6 and 7 designate glass plates provided on the opposite sides of a film conveyance path, reference numeral 8 denotes a capstan roller, reference numeral 9 designates a pinch roller, and reference numeral 10 denotes a take-up reel. The supply reel 1 and the take-up reel 10 are connected to a film tensioning and taking-up motor, and the capstan roller 8 is connected to a film driving motor.

The microfilm F is extended between the supply reel 1 and the take-up reel 10 and may be taken up onto the take-up reel or rewound onto the supply reel by the driving of the capstan roller 8.

Reference numeral 11 designates a mark detector, reference numeral 12 denotes a projection lens, and reference numeral 13 designates a screen.

The microfilm F, as shown in FIG. 2, has frames 15 in each of which is recorded an image and marks 16 provided at one side edge of the frames 15 and different in concentration from the marginal portion (the base portion) of the microfilm. The frames and marks on the film are illuminated by the light of the lamp 4 as they pass between the glass plates 6 and 7, and the image of the illuminated frame is projected onto the screen 13. In the present embodiment, use is made of a negative film in which the base portion B is transparent and the marks 16 are opaque, but alternatively, use may be made of a positive film in which the base portion is opaque and the marks are transparent.

The mark detector 11 is comprised of an optical fiber 20 and a photoelectric conversion element (hereinafter referred to as the sensor) 21, the fore end of the optical fiber 20 being disposed in opposed relationship with a path along which the marks 16 and the base portion B pass, and the near end of the optical fiber 20 being disposed in opposed relationship with the sensor 21. The sensor 21 receives the light from the lamp 4 transmitted through the film, through the optical fiber 20.

When the film F is transported in the direction of the arrow, the light entering the sensor 21 is intermittently intercepted by the base portion B and the marks 16. Instead of using an optical fiber, the mark detector may be constructed so that the light from the film may be directly received by the sensor.

Referring now to FIG. 3 which shows the mark detecting circuit of the above-described searching apparatus, reference numeral 22 designates an amplifying circuit for amplifying the output of the sensor 21, reference numeral 23 denotes a maximum detecting circuit for detecting and memorizing the maximum value of the output of the amplifying circuit 22, reference numeral 26 designates a first threshold setting circuit for setting a predetermined threshold level (a first reference value), and reference numeral 27 denotes a second threshold setting circuit for setting a threshold level (a second reference value) in accordance with the maximum value detected by the maximum detecting circuit 23. The second threshold setting circuit 27 puts out a threshold voltage corresponding to the detected maximum value. Reference numeral 28 designates a comparing circuit for comparing the threshold voltage put out from the first threshold setting circuit 26 or the second threshold setting circuit 27 with the output of the amplifying circuit 22 to thereby detect the presence or absence of the mark and for outputting a mark detection signal when it detects the presence of the mark. Reference numerals 30 and 31 denote differentiating circuits. The differentiating circuit 30 puts out a pulse signal during the falling of the output signal of the amplifying circuit 22, and the differentiating circuit 31 puts out a pulse signal during the falling of the output signal of the comparing circuit 28. Reference numeral 33 designates a control circuit for controlling the operation of each of said circuits. The control circuit 33 puts out a control signal for operating each circuit at a predetermined timing on the basis of the pulse signals sent from the differentiating circuits 30 and 31.

The threshold value of the first threshold setting circuit 26 is preset to a predetermined value before searching is started. The threshold value of the second threshold setting circuit 27 is set to one of three different threshold values in conformity with the maximum value detected by the maximum detecting circuit 23.

As the maximum detecting circuit, use may be made of a charging circuit for charging a capacitor by the output signal of the sensor, or a computer system in which the output signal of the sensor is sent to a computer through a digital-analog converting circuit (a D/A converting circuit) and the maximum value is operated by the computer.

Figure 4:
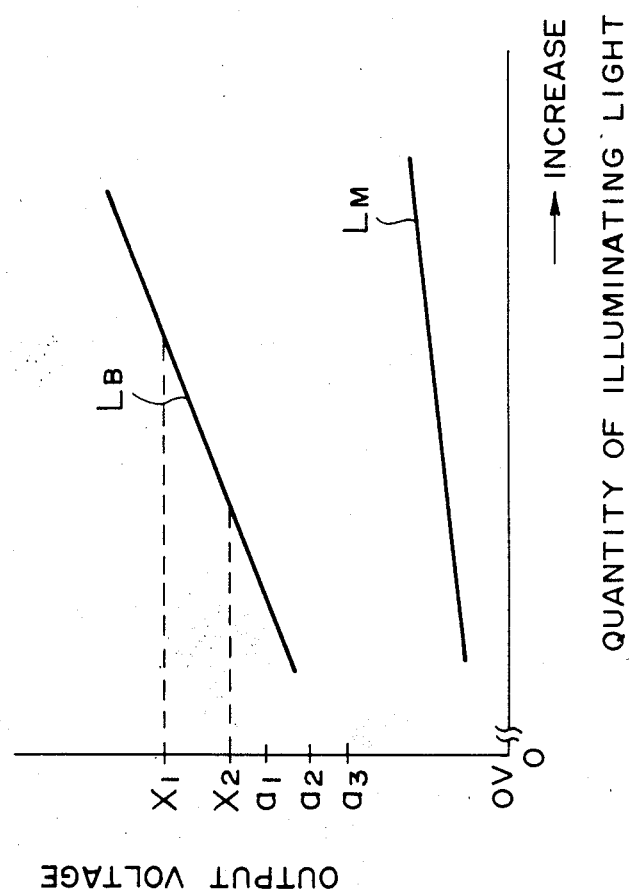
FIG. 4 is a graph showing the relation between the quantity of illuminating light and the output voltage.

FIG. 4 is a graph showing the relation between the quantity of illuminating light for the film and the output voltage of the amplifying circuit. In FIG. 4, the abscissa represents the quantity of illuminating light and the ordinate represents the output voltage of the amplifying circuit. Where a film of a certain concentration is illuminated with the quantity of illuminating light being changed, if the base portion (low concentration) of the film is detected by the sensor, the output voltage becomes a straight line LB, and if the mark (high concentration) is detected by the sensor, the output voltage becomes a straight line LM.

In the present embodiment, when the output voltage of the amplifying circuit is $X_1$ or greater, that is, when the maximum voltage detected by the maximum detecting circuit 23 is $X_1$ or greater, the threshold level is set to a voltage $a_1$, and when the output voltage is between $X_1$ and $X_2$, the threshold level is set to a voltage $a_2$, and when the output voltage is $X_2$ or less, the threshold level is set to a voltage $a_3$.

In the above-described embodiment, the threshold level is set to three different threshold values by the second threshold setting circuit in conformity with the detected maximum voltage, but may alternatively be set to two or more threshold levels. It is desirable that these threshold values be set to a value of about 30%–70% of the detected maximum voltage.

Figure 5:
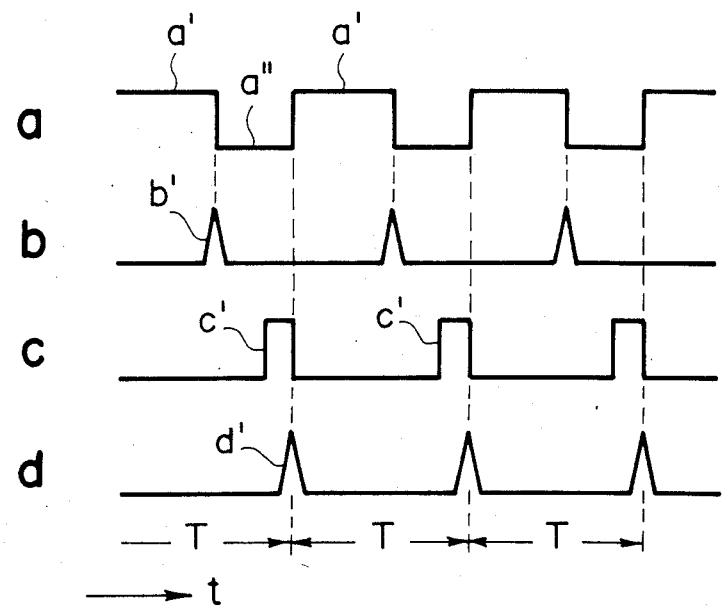
FIG. 5 shows the signal wave forms of the various output terminals of the mark detecting circuit.

FIG. 5 shows the output wave forms of the various portions of the mark detecting circuit.

Operation of the above-described apparatus will now be described. When the film F is transported in the direction of the arrow by a search starting command, where the base portion B of the film is transparent (low concentration) and the marks 16 are opaque (high concentration), a high level signal a' is put out from the amplifying circuit 22 when the base portion B has become positioned at the fore end of the optical fiber 20, and a low level signal a'' is put out from the amplifying circuit 22 when the mark 16 has become positioned at the fore end of the optical fiber 20 (see the wave form of FIG. 5a). That is, the output voltage of the amplifying circuit 22 assumes a low level when the sensor 21 is receiving a light signal from the mark 16.

Description will first be made of a case where the presence or absence of the mark is judged by the utilization of the second threshold value set by the second threshold setting circuit 27. The maximum detecting circuit 23 detects and memorizes the maximum value of the output of the amplifying circuit 22 which the sensor 21 is receiving the light signal from the base portion B. When the output of the amplifying circuit 22 has fallen, that is, when the sensor 21 has detected the mark 16, a pulse signal b' (the wave form of FIG. 5b) is put out from the differentiating circuit 30.

Upon reception of the pulse signal b', the control circuit 33 causes the threshold voltage corresponding to the maximum value detected by the maximum detecting circuit 23 to be put out from the second threshold setting circuit 27, and causes the comparing circuit 28 to compare the output of the amplifying circuit 22 with the threshold voltage put out from the circuit 27. The voltage of the signal a'' put out from the amplifying circuit 22 when the sensor 21 is detecting the mark becomes lower than the threshold voltage put out from the second threshold setting circuit 27 and at this time, the comparing circuit 28 puts out a mark detection signal c' (the wave form of FIG. 5c). This mark detection signal is counted by the counter unit of the searching apparatus. The searching apparatus utilizes the count value of the counter unit to search a desired frame, and the details thereof are known from U.S. Pat. No. 3,999,846 and therefore need not be described.

After the comparing circuit 28 has put out the mark detection signal, a pulse signal d' (the wave form of FIG. 5d) is put out from the differentiating circuit 31 during the falling of the mark detection signal. Upon reception of the pulse signal d', the control circuit 33 resets the maximum detecting circuit 23 and erases the memorized maximum value, renders the detecting circuit 23 into its initial state, causes the detecting circuit 23 to start the detecting operation again and at the same time, stops the comparing operation of the comparing circuit 28.

Thereafter, as previously described, the circuit 23 detects the maximum value and the differentiating circuit 30 puts out a pulse signal, whereafter a threshold voltage corresponding to the detected maximum value is put out from the second threshold setting circuit 27, and the two input values are compared by the comparing circuit 28 and, when the output voltage of the amplifying circuit 22 is smaller than the threshold voltage, the mark detection signal is put out from the comparing circuit 28.

Thereafter, each time the mark detection signal is put out, the above-described operation is repeatedly effected.

Thus, even if the quantity of illuminating light, etc. fluctuate during the searching operation, the mark can be reliably detected to enable a proper searching operation to be accomplished.

The detection of the maximum value, the setting of the threshold level and the comparing operation are effected during the period of time T shown in FIG. 5, or in other words, during each period in which a mark is detected.

Description will now be made of a case where the first threshold value set by the first threshold setting circuit 26 is utilized to discriminate the marks. Usually, a leader tape is connected to the leading end of the microfilm by a tacky tape and, by automatically transporting this leader tape from the supply reel 1 to the take-up reel, the leading end of the film is auto-loaded to the take-up reel and the auto-loading is terminated after the leader tape has been wound on the take-up reel 10.

In some cases, the leader tape or the tacky tape differs in concentration from the base portion of the microfilm and, if the presence or absence of the mark is discriminated during the auto-loading by the utilization of the output of the second threshold setting circuit 27, the mark detector may detect the leader tape or the tacky tape of lower concentration than the marks as the marks by mistake.

Also, when the main switch is closed to turn on the lamp 4 in a state in which a selected frame in the microfilm is placed at a projecting position and the initiation of searching has been commanded from this state, it is sometimes impossible to detect the mark passing through the mark detecting position at first when the transport of the film has been started, depending on the positional relation between the lamp and the film. That is, if the mark is placed at the detecting position and the detection signal of this mark is not put out, the main switch is again opened and, if searching is initiated when the main switch is closed, this mark is not detected. According to the present invention, the first threshold setting circuit is provided so that the first mark (the mark placed at the detecting position when the main switch is closed) can be reliably detected even during auto-loading or during the closing of the main switch. That is, an initial setting signal is set to the input line 33a of the control circuit 33 when the auto-loading is initiated or when the main switch is closed, and upon reception of the initial setting signal, the control circuit 33 changes over so that the output of the first threshold setting circuit 26 is sent to the comparing circuit 28 and the output of the second threshold setting circuit 27 is not sent to the comparing circuit 28.

Figure 6:
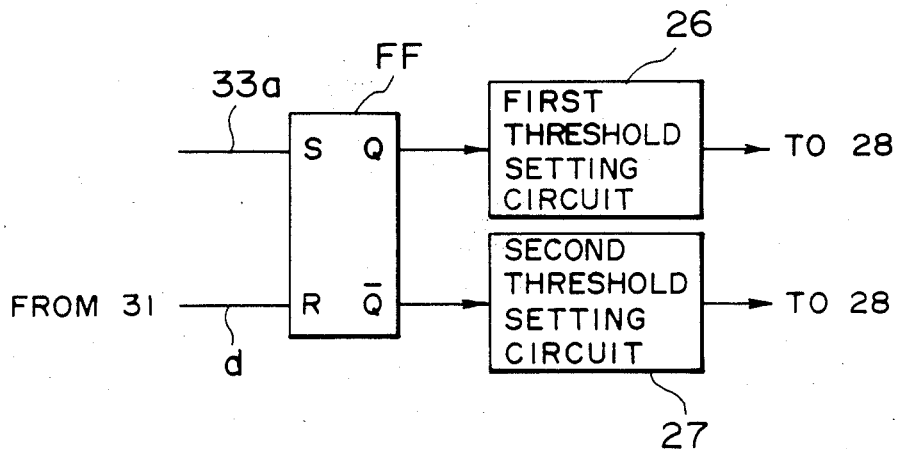
FIG. 6 shows an embodiment of the change-over circuit.

FIG. 6 shows an example of the change-over circuit for selecting which of the threshold values of the first threshold setting circuit and the second threshold setting circuit is to be sent to the comparing circuit. In FIG. 6, FF designates a flip-flop circuit adapted to be set when an initial setting signal is input from the input line 33a to the setting side input terminal S and to be reset when a pulse signal is sent from the differentiating circuit 31 to the resetting side input terminal R.

When the flip-flop FF is set, the first threshold value set by the first threshold setting circuit 26 is sent to the comparing circuit 28, and when the flip-flop FF is reset, the second threshold value set by the second threshold setting circuit 27 is sent to the comparing circuit 28.

The threshold value of the first threshold setting circuit 26 is manually preset before the initiation of searching in conformity with the concentration of the leader tape or the tacky tape or with the displacement of the position of the film from the illuminating optical path. Where a plurality of films using the same leader tape and tacky tape are interchangeably used, if the threshold value of the first threshold setting circuit 26 is once set to a predetermined value, it is not necessary to change the threshold value of the circuit 26 each time the film is interchanged.

When the first threshold setting-circuit 26 is selected at the initiation of the transport of the film, the threshold voltage put out from the first threshold setting circuit 26 is sent to the comparing circuit 28. The comparing circuit 28 puts out a mark detection signal when the output of the amplifying circuit 22 has become smaller than the threshold voltage put out from the first threshold setting circuit 26, and this mark detection signal is counted by the aforementioned counter unit.

When the first mark detection signal is put out from the comparing circuit 28 after the first threshold setting circuit 26 has been selected, a pulse signal is put out from the differentiating circuit 31 and is sent to the control circuit 33.

Upon reception of this pulse signal, the control circuit 33 changes over so as to select the second threshold setting circuit 27. That is, it changes over so that the output of the second threshold setting circuit 27 is sent to the comparing circuit 28 and the output of the first threshold setting circuit 26 is not sent to the comparing circuit 28. Thereafter, operation takes place so that a mark detection signal is produced by the utilization of the output of the second threshold setting circuit 27, but the details thereof have already been described and therefore need not be described.

Accordingly, during the auto-loading or during the closing of the main switch, mark detection is effected by the use of the first threshold value preset by the first threshold setting circuit 26 and, after the first mark has been detected, mark detection is effected by the use of the second threshold value set by the second threshold setting circuit 27 in conformity with the output of the photoelectric conversion element, whereby all the marks on the film can be reliably detected.

In the above-described embodiment, the marks are detected by a single sensor, but the marks can also be detected by a plurality of sensors.

Where use is made of a positive film in which the base is opaque (high concentration) and the marks are transparent (low concentration), the minimum value of the output of the amplifying circuit 22, i.e., the minimum value of the voltage put out when the base of the film has been detected, may be detected so that the second threshold value may be set in accordance with this detected value. In such case, it is desirable that the second threshold value be set to a value of the order of 150%–300% of the detected minimum voltage.

As a sensor for detecting the maximum value, a sensor for detecting the maximum quantity of light may specially be provided separately from the mark detecting sensor 21. Also, design may be made such that the rising of the output of the amplifying circuit is differentiated to produce a pulse signal and this signal is sent to the control circuit 33 to reset the detecting circuits 23, 24 and the operating circuit 25.

With the above-described construction, even if the lamp is deteriorated or the quantity of light of the lamp is fluctuated by the fluctuation of the power source voltage or the concentration of the information recording medium differs, the marks can be reliably detected and moreover, the first mark can be reliably detected at the initiation of searching. As a result, erroneous searching can be prevented and the reliability of the searching apparatus is improved.

FIG. 7 shows another embodiment of the present invention in which the maximum value and the minimum value of the output of the sensor 21 are used to set the second threshold value. In FIG. 7, members similar to those in the previous embodiment are given similar reference numerals.

In FIG. 7, reference numeral 24 designates a minimum detecting circuit for detecting and memorizing the minimum value of the output of the amplifying circuit 22, and reference numeral 25' denotes an operating circuit.

The operating circuit 25' operates the difference C between a maximum value (voltage) A detected by the maximum detecting circuit 23 and a minimum value (voltage) B detected by the minimum detecting circuit 24, and a threshold level corresponding to the operated value (voltage) C is set by the second threshold setting circuit 27. For example, the second threshold setting circuit 27 puts out a threshold voltage of a value of ½ of the operated value C of the operating circuit 25'. As the minimum detecting circuit, use may be made of a discharging circuit for discharging a capacitor by the output signal of a sensor, or a computer system for operating the maximum value by an A/D converting circuit and a computer.

Description will now be made of a case where, in the apparatus of FIG. 7, the presence or absence of the mark is judged by the utilization of the output of the second threshold setting circuit 27. The maximum detecting circuit 23 and the minimum detecting circuit 24 detect and memorize the maximum value and the minimum value of the output of the amplifying circuit 22 while the sensor 21 is receiving the light signals from the base B and the mark 16. When the output of the amplifying circuit 22 has fallen, that is, when the sensor 21 has detected the mark 16, a pulse signal b' (the wave form of FIG. 5b) is put out from the differentiating circuit 30.

Upon reception of the pulse signal b', the control circuit 33 sends to the operating circuit 25' the maximum value detected by the maximum detecting circuit 23 and the minimum value detected by the minimum detecting circuit 24 to cause the operating circuit 25' to effect an operation at a point of time whereat the minimum detecting circuit 24 detects a low level signal a" put out from the amplifying circuit 22, and causes a threshold voltage corresponding to the result of the operation to be put out from the second threshold setting circuit 27, and the comparing circuit 28 compares the output of the amplifying circuit 22 with the threshold voltage put out from the circuit 27, thus detecting the presence or absence of the mark.

The voltage of the signal a" put out from the amplifying circuit 22 when the sensor 21 detects the mark becomes lower than the threshold voltage put out from the second threshold setting circuit 27 and, at this time, the comparing circuit 28 puts out a mark detection signal c' (the wave form of FIG. 5c). This mark detection signal is counted by the counter unit of the searching apparatus.

When the mark detection signal has fallen after the comparing circuit 28 has put out the mark detection signal, a pulse signal d' (the wave form of FIG. 5d) is put out from the differentiating circuit 31.

Upon reception of the pulse signal d', the control circuit 33 resets the maximum detecting circuit 23 and the minimum detecting circuit 24 and erases the maximum value and the minimum value memorized therein and renders these into their initial state, and causes the detecting operation to be again started and at the same time, resets the operating circuit 25' and stops the comparing operation of the comparing circuit 28.

Thereafter, as previously described, the circuits 23 and 24 detect the maximum value and the minimum value, respectively, and the differentiating circuit 30 puts out a pulse signal, whereafter the detected maximum value and minimum value are sent to the operating circuit 25', which thus effects an operation, and a threshold voltage corresponding to the operated value is put out from the second threshold setting circuit 27, and two input values are compared by the comparing circuit 28 and, when the output voltage of the amplifying circuit 22 is smaller than the threshold voltage, a mark detection signal put out from the compairing circuit 28.

Thereafter, the above-described operation is repeatedly effected each time a mark detection signal is put out.

In the above-described embodiment, the second threshold value is set on the basis of the maximum value and the minimum value and therefore, even if the concentrations of the base and marks of the film vary, the marks can be accurately detected.

The detection and operation of the maximum and minimum values, the setting of the threshold level and the comparing operation are effected during the period of time T in FIG. 5 each time a mark is detected.

In order that the comparing operation by the comparing circuit 28 may be effected while the sensor 21 is detecting the mark, it is necessary that the length of the mark for counting in the direction of film transport be a predetermined length or greater. If the film in use is a film having standard marks now commercially available in the market, the present invention can be applied thereto. If the length of the mark is shorter, the transport speed of the film may be suitably reduced.

Figure 8:
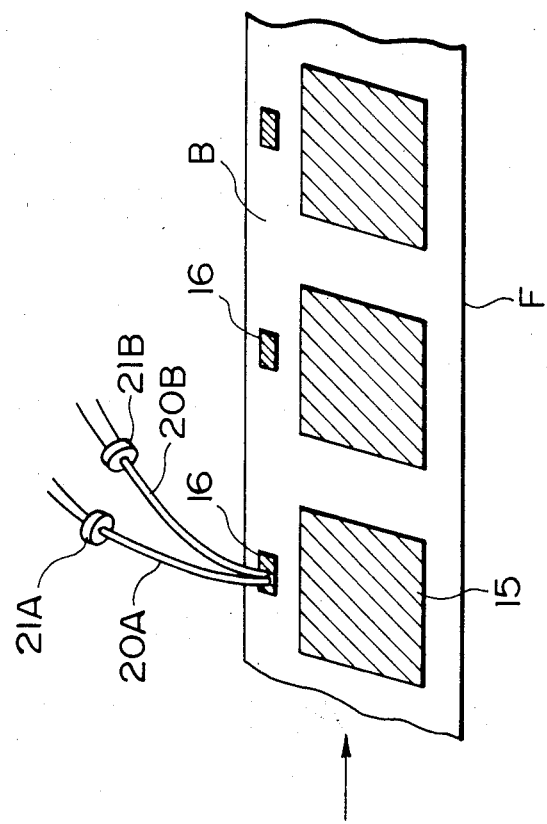
FIG. 8 is a perspective view showing another embodiment of the mark detector.
Figure 10:
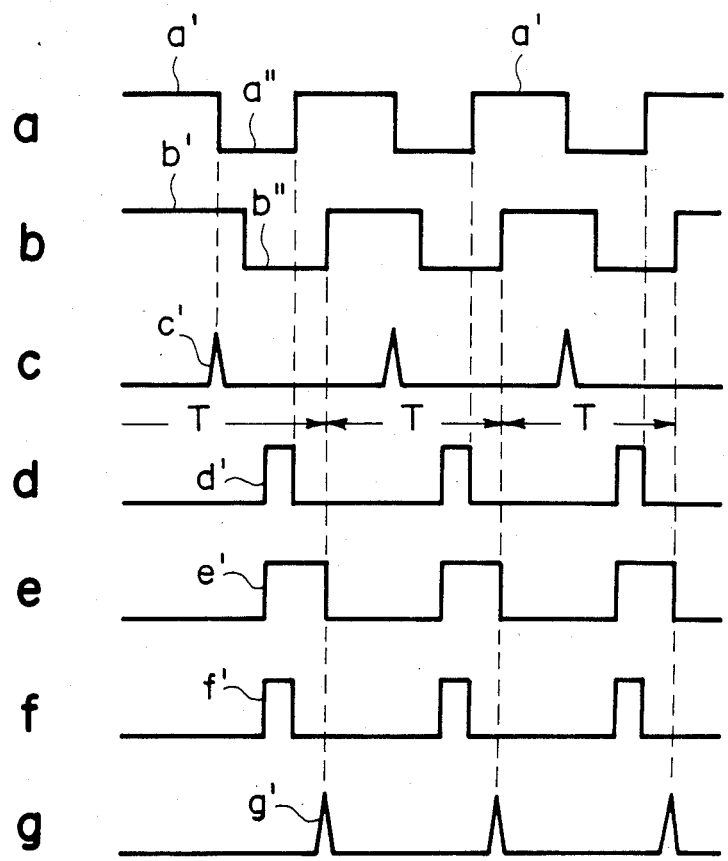
FIG. 10 shows the output wave forms of the various portions of FIG. 9.

FIGS. 8 to 10 show still another embodiment of the present invention. In this embodiment, the mark detector is comprised of two sensors.

In FIG. 8, the mark detector is comprised of optical fibers 20A, 20B and sensors 21A, 21B, and the fore ends of the optical fibers 20A, 20B are disposed in opposed relationship with the path along which the marks 16 and the base portion B pass, and the rear end of the optical fiber 20A is disposed in opposed relationship with the sensor 21A, while the rear end of the optical fiber 20B is disposed in opposed relationship with the sensor 21B. The sensors 21A and 21B receive the light from the lamp 4 transmitted through the film, through the optical fibers 20A and 20B. The spacing between the fore ends of the optical fibers 20A and 20B in the direction of film transport is smaller than the length of each mark 16 in the direction of film transport.

When the film F is transported in the direction of the arrow, the light entering the sensors 21A and 21B is intermittently intercepted by the marks 16.

Instead of using optical fibers, the mark detector may be constructed so that the light from the film is directly received by the sensors.

Referring to FIG. 9 which shows the mark detecting circuit of the searching apparatus of FIG. 8, reference character 22A designates an amplifying circuit for amplifying the output of the sensor 21A, reference character 22B denotes an amplifying circuit for amplifying the output of the sensor 21B, reference numeral 23 designates a maximum detecting circuit for detecting the maximum value of the output of the amplifying circuit 22A, reference numeral 24 denotes a minimum detecting circuit for detecting the minimum value of the output of the amplifying circuit 22A, reference numeral 25' designates an operating circuit for effecting an operation on the basis of the value detected by the maximum detecting circuit 23 and the value detected by the minimum detecting circuit 24, and reference numeral 27' denotes a threshold setting circuit for setting a threshold level in accordance with the operated value of the operating circuit 25'. The threshold setting circuit 27' puts out a threshold voltage corresponding to the operated value.

Reference numeral 28' designates a first comparing circuit for comparing the threshold voltage put out from the threshold setting circuit 27' with the output of the amplifying circuit 22A and judging the presence or absence of the mark, and reference numeral 29 denotes a second comparing circuit for comparing the threshold voltage put out from the threshold setting circuit 27' with the output of the amplifying circuit 22B and judging the presence or absence of the mark. Reference numerals 30 and 31 designate differentiating circuits. The differentiating circuit 30 puts out a differentiating signal during the falling of the output signal of the amplifying circuit 22A, and the differentiating circuit 31 puts out a differentiating signal during the falling of the output signal of the second comparing circuit 29.

Reference numeral 33 designates a control circuit for controlling the operation of each circuit. The control circuit 33 puts out a control signal for operating each circuit at a predetermined timing on the basis of the differentiating signals sent from the differentiating circuits 30 and 31. Reference numeral 37 denotes an AND gate circuit.

The operating circuit 25' operates the difference C between the maximum value (voltage) A detected by the maximum detecting circuit 23 and the minimum value (voltage) B detected by the minimum detecting circuit 24, and a threshold level corresponding to the operated value (voltage) C is set by the threshold setting circuit 27'. For example, the threshold setting circuit 27' puts out a threshold voltage of a value of ½ of the operated value C of the operating circuit 25'.

FIG. 10 shows the output wave forms of the various portions of the mark detecting circuit.

Operation of the above-described apparatus will now be described. Where the base portion B of the film is transparent and the marks 16 are opaque, the film is transported in the direction of the arrow by a search starting command and, when the base portion B has become positioned at the fore ends of the optical fibers 20A and 20B, high level signals a' and b' are put out from the amplifying circuits 22A and 22B, respectively, and when the mark 16 has become positioned at the fore ends of the optical fibers 20A and 20B, low level signals a" and b" are put out from the amplifying circuits 22A and 22B, respectively (see the wave forms of FIGS. 10a and b). That is, the outputs of the amplifying circuits 22A and 22B assume a low level when the sensors 21A and 21B are receiving the light signal from the mark 16.

Now, when the sensor 21A receives the light signal from the base B, the maximum detecting circuit 23 detects the maximum value of the output of the amplifying circuit 22A by the control signal put out from the control circuit 33 and, when the output of the amplifying circuit 22A has fallen, that is, when the sensor 21A has detected the mark 16, a differentiating signal c' (the wave form of FIG. 10c) is put out from the differentiating circuit 30.

Upon reception of the differentiating signal c', the control circuit 33 sends to the operating circuit 25' the maximum value detected by the maximum detecting circuit 23 and the minimum value detected by the minimum detecting circuit 24 at a point of time whereat the minimum detecting circuit 24 detects the low level signal a" put out from the amplifying circuit 22A, and causes the operating circuit 25' to effect an operation and causes a threshold voltage corresponding to the result of the operation to be put out from the threshold setting circuit 27', and the first comparing circuit 28' compares the output of the amplifying circuit 22A with the threshold voltage.

The voltage of the signal a" put out from the amplifying circuit 22A when the sensor 21A is detecting the mark becomes lower than the threshold voltage put out from the threshold setting circuit 27' and at this time, the first comparing circuit 28' puts out a mark detection signal d' (the wave form of FIG. 10d). This mark detection signal is sent to an AND gate 37.

On the other hand, the second comparing circuit 29 compares the threshold voltage sent from the threshold setting circuit 27' with the output of the amplifying circuit 22B and, when the output voltage of the amplifying circuit 22B has become lower than the threshold voltage, the second comparing circuit 29 puts out a mark detection signal e'. The AND gate 37 puts out a counting signal f' when the mark detection signals are put out from the comparing circuits 28' and 29, and this signal f' is counted by the counter unit of the searching apparatus.

When the mark detection signal e' has fallen after the second comparing circuit 29 has put out the mark detection signal, a differentiating signal g' (the wave form of FIG. 10g) is put out from the differentiating circuit 31.

Upon reception of the differentiating signal g', the control circuit 33 resets the maximum detecting circuit 23 and the minimum detecting circuit 24 and renders them into their initial state and causes them to again start the detecting operations and at the same time, resets the operating circuit 25' to thereby stop the comparing operations of the comparing circuits 28' and 29.

Thereafter, as previously described, the circuits 23 and 24 detect the maximum value and the minimum value, respectively, and the differentiating circuit 30 puts out a differentiating signal, whereafter the detected maximum and minimum values are sent to the operating circuit 25', which thus effects an operation, and a threshold voltage corresponding to the operated value is put out from the threshold setting circuit 27', and two input values are compared by the comparing circuits 28' and 29 and, when the output voltages of the amplifying circuits 22A and 22B are smaller than the threshold voltage, mark detection signals are put out from the comparing circuits 28' and 29.

Thereafter, the above-described operation is repeatedly effected each time the mark detection signal is put out.

The detection and operation of the maximum and minimum values, the setting of the threshold level and the comparing operation are effected during the period of time T in FIG. 10 each time the mark is detected.

In the above-described embodiment, the marks are detected by two sensors, but may alternatively be detected by three or more sensors. In such case, design is made such that the output of each sensor is compared with the threshold voltage set in conformity with the output of a sensor and a mark detection signal is put out and a counting signal is obtained when the detecting circuits of the sensors have put out mark detection signals.

Also, in the above-described embodiment, the maximum value and the minimum value are detected to thereby set the threshold level, but alternatively, only the maximum value or the minimum value may be detected and the threshold level may be set in conformity with the detected value. For example, where use is made of a negative film in which the base portion is transparent and the marks are opaque, the maximum value of the output of the sensor (the voltage corresponding to the quantity of light from the base portion) is detected. Where use is made of a positive film in which the base portion is opaque and the marks are transparent, the minimum value of the output of the sensor (the voltage corresponding to the quantity of light from the base portion) is detected. In this case, the threshold voltage of the threshold setting circuit is set to a value of 30%–70% of the detected maximum voltage or a value of 130%–170% of the detected minimum voltage.

Where only the maximum value or the minimum value is to be detected, the detection period of the maximum detecting circuit or the minimum detecting circuit can be shortened and the time T shown in FIG. 10 can also be shortened. Accordingly, in such case, the marks can be reliably detected even if a film having marks of short length is transported at a high speed.

In the above-described embodiment, the threshold level is set by the output of the sensor 21A, but alternatively, the threshold level may be set by the output of the sensor 21B.

According to the above-described embodiment, it is not necessary to provide any special photoelectric converting means in addition to the photoelectric converting means for detecting the marks and therefore, the structure of the apparatus becomes simple and the apparatus can be made inexpensive. Further, the marks are detected by a plurality of photoelectric converting means and therefore, it never happens that dust or flaws on the film are detected by mistake, and the marks can be detected more reliably. Also, the threshold level is set by the output of a selected photoelectric converting means and the output of each photoelectric converting means is compared with this threshold level and therefore, the circuit becomes simple and reliability can be enhanced.

FIG. 11 shows yet still another embodiment of the present invention. In this embodiment, when the main switch has been opened, the so far set threshold voltage is memorized, whereafter when the main switch is closed to start the searching operation again, the first mark is compared with the memorized threshold value, thereby detecting the mark.

In FIG. 11, reference numeral 40 designates a threshold memorizing circuit for maintaining the threshold voltage set by the threshold setting circuit 27', and reference numeral 41 denotes a back-up power source for supplying a power to the memorizing circuit 40 when the power source of the apparatus has become exhausted. The threshold memorizing circuit 40 is supplied with a power from the back-up power source 41, and the threshold memorizing circuit 40 maintains the set threshold level even when the supply of power to the other circuits has been stopped, that is, when the power source of the apparatus has become exhausted.

Reference numeral 42 designates a comparing circuit for comparing the threshold voltage with the output of the amplifying circuit 22 and detecting the presence or absence of the mark when the threshold voltage is sent from the threshold memorizing circuit 40.

Operation of the above-described apparatus will now be described. Where the base portion B of the film is transparent (low concentration) and the marks 16 are opaque (high concentration), the film is transported by a search starting command and, when the base portion B has become positioned at the fore end of the optical fiber 20, a high level signal is put out from the amplifying circuit 22 and, when a mark 16 has become positioned at the fore end of the optical fiber 20, a low level signal is put out from the amplifying circuit 22. That is, the output voltage of the amplifying circuit 22 assumes a low level when the sensor 21 is receiving the light signal from the mark 16.

The maximum detecting circuit 23 detects the maximum value of the output of the amplifying circuit 22 when the sensor 21 is receiving the light signal from the base B, and pulse signal is put out from the differentiating circuit 30 when the output of the amplifying circuit 22 has fallen, that is, when the sensor 21 has detected the mark 16.

Upon reception of the pulse signal from the differentiating circuit 30, the control circuit 33 sends to the operating circuit 25' the maximum value detected by the maximum detecting circuit 23 and the minimum value detected by the minimum detecting circuit 24 to cause the operating circuit 25' to effect an operation at a point of time whereat the minimum detecting circuit 24 detects the low level signal put out from the amplifying circuit 22, and causes a threshold voltage corresponding to the result of the operation to be put out from the threshold setting circuit 27', and this threshold voltage is memorized by the threshold memorizing circuit 40. The comparing circuit 42 compares the output of the amplifying circuit 22 with the threshold voltage and detects the presence or absence of the mark.

The voltage of the signal a" put out from the amplifying circuit 22 when the sensor 21 is detecting a mark becomes lower than the threshold voltage set by the threshold setting circuit 27' and, at this time, the comparing circuit 42 puts out a mark detection signal. This mark detection signal is counted by the counter unit of the searching apparatus.

After the comparing circuit 42 has put out the mark detection signal, a pulse signal is put out from the differentiating circuit 31 during the falling of the mark detection signal.

Upon reception of the pulse signal from the differentiating circuit 31, the control circuit 33 resets the maximum detecting circuit 23 and the minimum detecting circuit 24 and causes the so far memorized maximum and minimum values to be erased and renders these circuits into their initial state, and causes them to start the detecting operation again and at the same time, resets the operating circuit 25' and the threshold memorizing circuit 40, and then stops the comparing operation of the comparing circuit 42.

Thereafter, as previously described, the maximum value and the minimum value are detected by the circuits 23 and 24, respectively, and a pulse signal is put out from the differentiating circuit, whereafter the detected maximum and minimum values are sent to the operating circuit 25, which thus effects an operation, and a threshold voltage corresponding to the operated value is put out from the threshold setting circuit 27', and this threshold value is held by the threshold memorizing circuit 40 and two input values are compared by the comparing circuit 42, and when the output voltage of the amplifying circuit 22 is smaller than the threshold voltage, a mark detection signal is put out from the comparing circuit 42.

Thereafter, the above-described operation is repeatedly effected each time the mark detection signal is put out.

When the power source of the apparatus has become exhausted in a state in which a mark is stopped at the mark detecting position and this mark is not detected by the mark detector, the threshold memorizing circuit 40 supplied with a power from the back-up power source 41 memorizes the threshold voltage and thereafter, when the main switch of the apparatus is closed to initiate the searching operation, the threshold voltage memorized by the memorizing circuit 40 is compared with the output of the amplifying circuit 22, whereby a mark detection signal is obtained from the mark placed at the mark detecting position. When the mark detection signal has fallen, a pulse signal is put out from the differentiating circuit 31 and the control circuit 33 effects the aforedescribed control operation, whereafter mark detection can be continued.

Accordingly, where the power source of the apparatus has become exhausted in a state in which a mark is stopped at the mark detecting position and this mark is not detected by the mark detector, if the main switch is thereafter closed to effect searching, this mark can be detected, whereby erroneous searching can be prevented.

The output of the sensor may be sent to a microcomputer through an A/D converting circuit, the maximum and minimum values of the output of the sensor may be operated by the microcomputer, a threshold level may be set on the basis of these values (or only one of the maximum value and the minimum value), and this threshold level may be memorized by a non-volatile RAM (random access memory).

We claim:

1. A mark detecting apparatus for detecting marks provided on a recording medium, having:
   photoelectric converting means for receiving light from the base and marks of the recording medium;
   first setting means for setting a first predetermined reference value;
   second setting means for setting a second reference value corresponding to the output of said photoelectric converting means; and
   judging means for selecting one of said first reference value and said second reference value and comparing the selected reference value with the output of said photoelectric converting means to thereby detect the presence or absence of the marks.

2. A mark detecting apparatus according to claim 1, wherein said photoelectric converting means as at leat one light-receiving element.

3. A mark detecting apparatus according to claim 1, wherein said second setting means sets said second reference value in accordance with a signal put out when said photoelectric converting means receives the light from the base.

4. A mark detecting apparatus according to claim 1, wherein said second setting means sets said second reference value in accordance with a signal put out when said photoelectric converting means receives the light from the base and the marks.

5. A mark detecting apparatus according to claim 1, wherein said judging means has change-over means for selecting said first reference value when the supply of power is started to said apparatus and selecting said second reference value after the first mark has been detected after the supply of power.

6. A mark detecting apparatus according to claim 1, wherein said judging means has change-over means for selecting said first reference value when a leader tape connected to an end of the recording medium is being conveyed to a predetermined position and selecting said second reference value after the first mark has been detected after said leader tape has been conveyed to said predetermined position.

7. A mark detecting apparatus for detecting marks provided on a recording medium, having:
   photoelectric converting means for receiving light from the base and marks of the recording medium;
   setting measns for setting a reference value in accordance with a signal put out when said photoelectric converting means receivers the light from the base and the marks; and
   judging means for comparing the reference value set by said setting means with the output of said photoelectric converting means to thereby detect the presence or absence of the marks.

8. A mark detecting appatatus according to claim 7, wherein said photoelectric converting means has at least one light-receiving element.

9. A mark detecting apparatus according to claim 7, wherein said setting means stores the set reference value, said stored reference value being erased by an output signal generated when said detecting means detects the mark.

10. A mark detecting apparatus for detecting marks provided on a recording medium, having:
    at least two photoelectric converting means for receiving light from the base and marks of the recording medium, said two photoelectric converting means being so located as to be capable of simultaneously detecting the mark on the recording medium;
    setting means for setting a reference value corresponding to the output of one of said two photoelectric converting means; and
    judging means for comparing the reference value set by said setting means with the output of each of said photoelectric converting means to thereby detect the presence or absence of the marks.

11. A mark detecting apparatus according to claim 1, further having control means for resetting said setting means when said detects means judges the presence of the marks and controlling said setting means so as to set a new reference value corresponding to a signal put out from said photoelectric converting means after the re-setting.

12. A mark detecting apparatus according to claim 10, wherein said setting means sets the reference value in accordance with a signal put out when one of said photoelectric converting means receives the light from the base.

13. A mark detecting apparatus according to claim 10, wherein said setting means sets the reference value in accordance with a signal put out when one of said photoelectric converting means receives the light from the base and the marks.

14. A mark detecting apparatus for detecting marks provided on a recording medium, having:
   photoelectric converting means for receiving light from the base and marks of the recording medium;
   setting means for setting a reference value corresponding to the output of said photoelectric converting menas;
   memory means for memorizing the reference value set by said setting means;
   back-up power source for supplying a power to said memory means when the power source of said apparatus has become exhausted; and
   judging means for comparing the reference value set by said setting means with the output of said photoelectric converting means to thereby detect the presence or absence of the marks.

15. A mark detecting apparatus according to claim 14, wherein said setting means sets the reference value in accordance with a signal put out when said photoelectric converting means receives the light from the base.

16. A mark detecting apparatus according to claim 14, wherein said setting means sets the reference value in accordance with a signal put out when said photoelectric converting means receives the light from the base and the marks.

17. A mark detecting apparatus according to claim 14, further having means for erasing the reference value when said judging means judges the presence of the marks and resettting said setting means.

18. An apparatus for detecting a mark provided correspondingly to each frame of a microfilm and counting the detected marks to thereby search a desired frame of the microfilm, having:
   conveying means for conveying the microfilm;
   illuminating means for illuminating the microfilm;
   a photo-responsive element for receiving light transmitted through the base and the marks of the illuminated microfilm;
   setting means for setting a reference value corresponding to the output of said photo-responsive element;
   comparing means for comparing the reference value set by said setting means with the output of said photo-responsive element to detect the marks;
   counter means for counting a signal put out when said comparing means detects the marks; and
   conveyance control means for comparing the count value of said counter means with the address of the frame to be searched to thereby control said conveying means.

19. Retrieving apparatus for retrieving an image, in which moving means moves an image record medium on which a mark different in darkness from its surroundings is recorded, and image retrieval is effected by detecting the mark on the image record medium at a mark detecting position, comprising:
   a photo-detecting element disposed at said mark detecting position for receiving a light passed through the image record medium and for generating an output signal corresponding to the amount of light passed therethrough;
   reference signal generating means for generating a reference signal on the basis of the output signal from said photo-detecting element corresponding to the light passed through a portion of the image record medium where no mark is recorded; and
   comparing means for comparing the output signal from said photo-detecting element with said reference signal to thereby detect the presence or absence of the mark.

20. Retrieving apparatus according to claim 19, wherein said comparing means generates a mark detection signal when a difference between the output signal from said photo-detecting element and said reference signal exceeds a predetermined value.

21. Retrieving apparatus according to claim 19, wherein said image record medium is a film, and said reference signal generating means sets the level of said reference signal on a basis of the output signal from said photo-detecting element generated when receiving the light passed through a portion of the film where neither image nor mark is recorded.

22. Retrieving apparatus according to claim 20, further comprising a non-volatile memory for memorizing the level of said reference signal.

* * * * *

UNITED STATES PATENT AND TRADEMARK OFFICE
CERTIFICATE OF CORRECTION

PATENT NO. : 4,665,318

DATED : May 12, 1987

INVENTOR(S) : TAKAO TODA, ET AL.

It is certified that error appears in the above-identified patent and that said Letters Patent is hereby corrected as shown below:

COLUMN 1

Line 22, "with the circuit to" should read --with the frame number of the desired information frame input from a keyboard or the like by a comparing circuit and when the two have become coincident with each other, a stop signal is put out from the comparing circuit to--.

COLUMN 8

Line 28, "put" should read --is put--.

COLUMN 14

Line 4, "as at leat" should read --has at least--.
Line 34, "measns" should read --means--.
Line 36, "receivers" should read --receives--.
Line 42, "appatatus" should read --apparatus--.
Line 65, "claim 1," should read --claim 10,--.
Line 67, "detects means judges" should read --judging means detects--.

UNITED STATES PATENT AND TRADEMARK OFFICE
CERTIFICATE OF CORRECTION

PATENT NO. : 4,665,318

DATED : May 12, 1987

INVENTOR(S) : TAKAO TODA, ET AL.

It is certified that error appears in the above-identified patent and that said Letters Patent is hereby corrected as shown below:

COLUMN 15

Line 20, "menas;" should read --means;--.
Line 44, "judges" should read --detects--.
Line 45, "resettting" should read --resetting--.

Signed and Sealed this

Eighteenth Day of August, 1987

Attest:

DONALD J. QUIGG

Attesting Officer

Commissioner of Patents and Trademarks